United States Patent [19]
Stirling et al.

[11] Patent Number: 5,716,445
[45] Date of Patent: Feb. 10, 1998

[54] PIGMENT

[75] Inventors: John Andrew Stirling, Glasgow; Brian Tuck, Renfrewshire; Robert Bruce McKay, Kilmarnock; Carol Jean Farnocchi, Renfrewshire, all of Scotland

[73] Assignee: Ciba Specialty Chemicals Corporation, Tarrytown, N.Y.

[21] Appl. No.: 799,968

[22] Filed: Feb. 14, 1997

[30] Foreign Application Priority Data

Feb. 14, 1996 [GB] United Kingdom ............... 9603116

[51] Int. Cl.$^6$ ..................................................... C09B 27/00
[52] U.S. Cl. ............................................. 106/496; 106/493
[58] Field of Search ................................. 106/496, 493

[56] References Cited

U.S. PATENT DOCUMENTS

| | | | |
|---|---|---|---|
| 4,515,639 | 5/1985 | Dopfer et al. | 106/496 |
| 5,062,894 | 11/1991 | Schwartz et al. | 106/493 |
| 5,382,288 | 1/1995 | Schenk et al. | 106/496 |
| 5,575,843 | 11/1996 | Krishnan et al. | 106/496 |

OTHER PUBLICATIONS

Derwent Abst. 87–230845/33 (Jul. 1987) of JP62–153353.

*Primary Examiner*—Mark L. Bell
*Assistant Examiner*—Scott L. Hertzog
*Attorney, Agent, or Firm*—Kevin T. Mansfield

[57] ABSTRACT

The present invention provides a novel polymorphic form of Colour Index Pigment Yellow 12 in a crystalline form which exhibits an X-ray diffraction pattern having three prominent X-ray diffraction lines corresponding to "d" spacings of 11.82, 7.71 and 3.32×10$^{-10}$ meters.

9 Claims, 1 Drawing Sheet

PIGMENT

The present invention relates to a novel polymorph of C.I. Pigment Yellow 12.

C.I. Pigment Yellow 12 is a diarylide yellow pigment obtained by coupling tetrazotised 3,3'-dichlorobenzidine and acetoacetanilide.

Diarylide Yellows are the basis for a large proportion of the yellow pigments used in the manufacture of inks with some lesser useage in plastics and paints. Within the chemical class common practice and the evolution of ink technology have selected three pigment types as being of major importance commercially in inks. These are Colour Index Pigment Yellow 12, Colour Index Pigment Yellow 13 and Colour Index Pigment Yellow 14 and their derivatives formed by mixed coupling e.g. Pigment Yellow 174. Although mixed coupling has been found to offer some advantages in controlling the pigment properties by influencing the molecular packing within the crystals and the size and shape of the pigment particles there is little equivalent technology to that of Copper Phthalocyanine or Quinacridone chemistry where there are several well identified and distinct polymorphic forms of the same chemical constitution and of which several of these polymorphic forms are manufactured in considerable quantities.

In the case of Pigment Yellow 12, hitherto methods of making this substance by coupling tetrazotised 3,3'-dichlorobenzidine and acetoacctanilide typically give a crystal form characterised by Bragg angles at 10.33 and 25.39 degrees in the powder X-ray diffraction pattern as illustrated in FIG. 1, Graph 1.

Japanese Patent Application J62-153353 to Toyo dated 1987 describes the formation of a new form of Pigment Yellow 12 by alkaline salt kneading and identifies the X-ray Diffraction Pattern for this material. The Bragg angles are at 11.5 and 25.7 degrees which are equivalent to "d" spacings of 7.69 and $3.47 \times 10^{-10}$ meters respectively.

Surprisingly we have now identified another distinct polymorph of Pigment Yellow 12 which can be easily distinguished from either the "normal" Yellow 12 or the polymorph described by Toyo by its powder X-ray diffraction pattern. According to the details of the preparation the new polymorph may be obtained essentially pure or in admixture with the "normal" Yellow 12 polymorph.

Whereas the Pigment Yellow 12 product of the invention has three main peaks with Bragg angles 7.47, 11.45 and 26.76 degrees corresponding to "d" spacings of 11.82, 7.71 and $3.32 \times 10^{-10}$ meters, the normal Pigment Yellow 12 polymorph shows two main peaks at Bragg angles 10.33 and 25.39 degrees corresponding to "d" spacings of 8.55 and $3.50 \times 10^{-10}$ meters. The polymorph described by Toyo has several large peaks, the biggest two at Bragg angles 11.5 and 25.7 degrees.

Accordingly the present invention provides Pigment Yellow 12 in a crystalline form which exhibits an X-ray diffraction pattern having three prominent X-ray diffraction lines corresponding to "d" spacings of 11.82, 7.71 and $3.32 \times 10^{-10}$ meters.

The new material is a Yellow pigment possessing excellent colour strength and other properties. For use as a colourant it may be further modified to improve the properties by methods known to those skilled in the art.

The present invention also provides a process for preparing the Pigment Yellow 12 polymorph of the invention by coupling tetrazotised 3,3'-dichlorobenzidine and acetoacetanilide in the presence of a surfactant of the polyamine, polyether, or tertiary or quaternary amine type.

Figure 1:
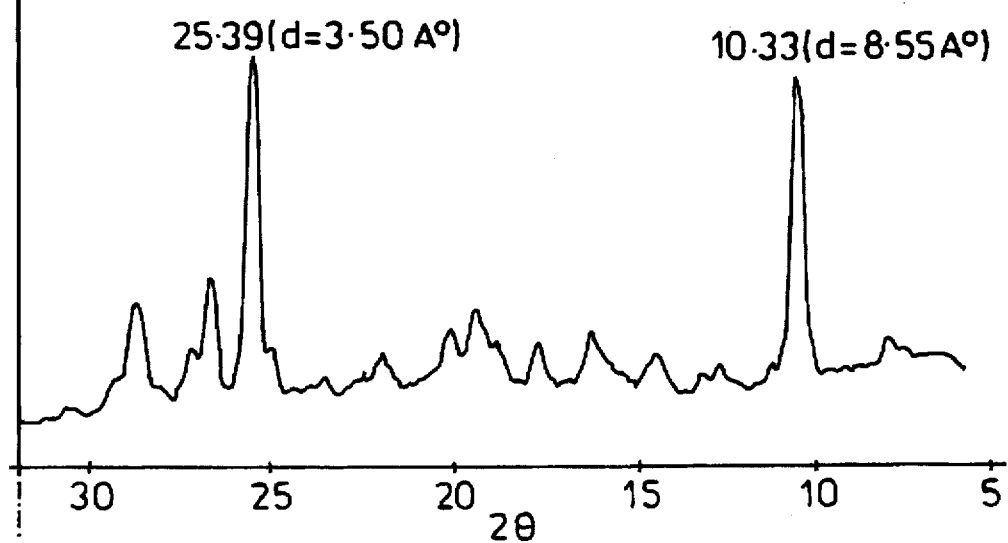
FIG. 1 shows the X-ray diffraction patterns of the prior art and the new polymorph.
Figure 1:
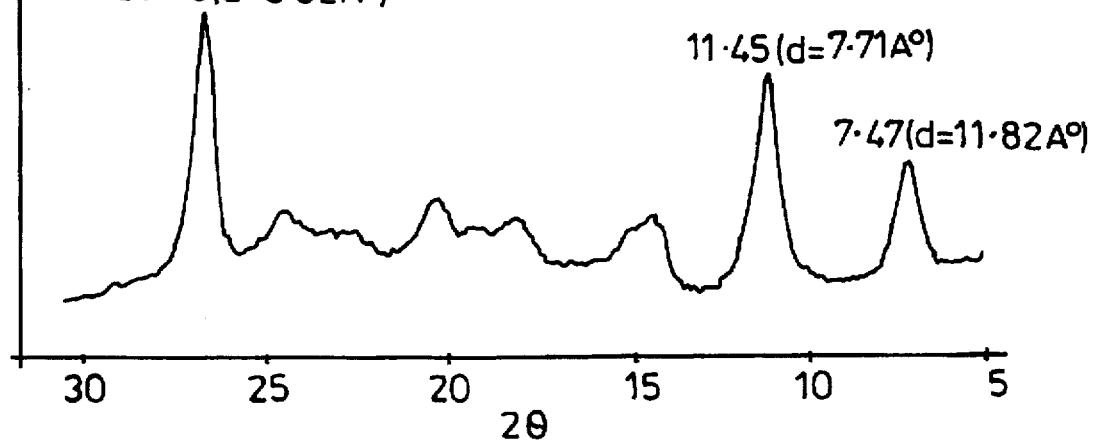

Examples of polyamine surfactants may be represented by, but not limited to, the compounds of formula I where R is for example an alkyl or aralkyl group, m>0, n equals 2 or 3.

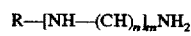

$$R\text{—}[NH\text{—}(CH)_n]_m\text{NH}_2 \qquad \text{I}$$

Examples of polyether surfactants may be represented by, but not limited to compounds of formula II where R is for example an alkyl or aralkyl group, m>0, n equals 2 or 3.

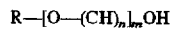

$$R\text{—}[O\text{—}(CH)_n]_m\text{OH} \qquad \text{II}$$

Tertiary and Quaternary amine surfactants may be of the types represented by, but not limited to, compounds of formulae III and IV where R, $R^1$, $R^{11}$, and $R^{111}$ are same or different and may be for example alkyl, aralkyl or aryl and X is an anione species.

$$R\ R^1\ R^{11}\ N \qquad \text{III}$$

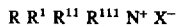

$$R\ R^1\ R^{11}\ R^{111}\ N^+\ X^- \qquad \text{IV}$$

In order to obtain the new polymorph of the present invention it is necessary for the surfactant to be present during the coupling. It may be added at any point prior to completion of the coupling, for example in the acid used to precipitate the coupling component or directly to the slurry after precipitation of the coupling component. If the surfactant is added after completion of the coupling then the product is the hitherto known Pigment Yellow 12 polymorph.

The Pigment Yellow 12 of the present invention can be prepared in an essentially pure form by selection of the type and relative proportion of the surfactant used. For example when the coupling reaction is carried out in the presence of the compound of formula I where R=stearyl, m=3 and n=3 in an amount 15% w/w relative to the amount of Pigment Yellow 12 formed in the reaction, then the product is essentially completely the polymorph of the invention. Alternatively the conditions of the preparation may be selected to obtain a mixture of the hitherto unknown polymorph and normal polymorph. The relative proportions of the two polymorphs may be controlled by the type and relative proportion of the surfactant used. In general higher proportions of surfactant with respect to coupling component lead to higher proportion of the hitherto unknown polymorph in the Pigment Yellow 12 product.

When mixtures are obtained the polymorph may be present in amounts of at least 10%, preferably at least 25% and more preferably at least 50% by weight of the total amount of Pigment Yellow 12.

The Pigment Yellow 12 products of the invention may also be given an after treatment to improve their properties as colourants. Methods of after treatment are well known to those skilled in the art of pigment manufacture. Typical examples are described in for example British Patent 1,356,253.

One useful after-treatment is heating the aqueous pigment slurry, obtained at the end of the coupling process at a temperature ranging from 70° to 130° C. preferably from 70° to 100° C.

A further useful after-treatment is treatment with an organic solvent such as an aromatic or aliphatic hydrocarbon, a chlorinated hydrocarbon, an alcohol, ester, ether, nitrile, nitro compound or heterocyclic compound, specific examples of which are tetralin, dibenzyl ether, o-dichlorobenzene and dibutyl sebacate;

Addition of a second surfactant of anionic, cationic, amphoteric or non-ionic type is yet another after-treatment which may be used. Anionic sufactants which may be used are, e.g. alkyl-, aryl- or aralkyl sulphates or sulphonates; alkyl-, aryl- or aralkyl phosphates or -phosphonates; or carboxylic acids. Cationic surfactants which may be used are, e.g. primary-, secondary- or teriary amines, or quaternary salts of amines. Non-ionic surfactants which are suitable for use include long chain alcohols, alcohol- or amine/ ethylene oxide condensates, amine oxides or phosphine oxides.

The Pigment Yellow 12 of the present invention may be after-treated with an aliphatic primary amine which may be the same or different amine to that used during the coupling reaction to obtain the substance of the invention.

Such amines include, e.g. stearylamine, resin amine derived from wood rosin, N-alkyl-alkylenediamines, polyamines such as N-alkyl-tripropylenetetramine, tetraethylenepentamine or polyethylene imine, or ethoxylated di- or tri-amines.

Another after-treatment is the resination of the Pigment Yellow produced according to the process of the invention, using a natural or synthetic resin. Resins which are soluble in alkaline solution and which may be precipitated onto the pigment with acid, are preferred. Such preferred resins are, e.g. wood rosin, or a rosin which has been chemically modified, e.g. by hydrogenation, disproportionation, polymerisation or by reaction with an organic reactant. The proportion of resin used in the after-treatment may vary within a wide range, and may amount to 1 to 60%, more preferably from 25 to 55% by weight, based on the weight of the Pigment Yellow 12.

The properties of the Pigment Yellow 12 according to the present invention may be modified by incorporation of a water-soluble azo dyestuff, preferably in an amount ranging from 0.1 to 25% by weight, based on the weight of the pigment as described in GB 1366253.

The Pigment Yellow 12 polymorph of the present invention or mixtures thereof with the hitherto known polymorph of Pigment Yellow 12 are useful in the colouration of surface coatings, especially printing inks, and the colouration of plastics.

The invention is illustrated by the following Examples.

EXAMPLES 1 TO 5

7.5 parts of aliphatic polyamine (see Table below) are dissolved by stirring in 11.5 parts of glacial acetic acid in 150 parts of water. This solution is slowly added, with stirring, to 24.6 parts of acetoacetanilide dissolved in a solution of 5.5 parts of sodium hydroxide in 240 parts of water. The resultant mixture is reacted with 17 parts of 3,3'-dichlorobenzidine, previously tetrazotised with sodium nitrite and dilute hydrochloric acid in the usual manner. The coupled slurry is then heated to 90 to 95 degrees C. and the pH is adjusted to 11 by the addition of alkali. The product is then filtered, washed with water to remove soluble salts and then dried.

TABLE 1

| EXAMPLE | AMINE |
| --- | --- |
| 1 | N-stearyl propylene diamine |
| 2 | N-stearyl dipropylene triamine |
| 3 | N-stearyl tripropylene tetramine |
| 4 | N-stearyl tetrapropylene pentamine |
| 5 | N-stearyl pentapropylene hexamine |

The Pigment Yellow 12 product in each example is examined by powder X-ray diffraction and found to be essentially the new polymorph of the invention as illustrated in FIG. 1, Graph 2.

EXAMPLES 6–8

Pigment Yellow 12 is prepared by essentially the method used in Examples 1–5 but varying the preparation of amine used in the reaction. The products are examined by powder X-ray diffraction. Comparison of the XRD traces with those of pure samples of the Pigment Yellow 12 polymorph of the invention and the polymorph hitherto known allows approximate percentage composition to be determined.

TABLE 2

| EXAMPLE | AMINE | % AMINE* | % POLYMORPH OF THE INVENTION |
| --- | --- | --- | --- |
| 6 | N-stearyl tetrapropylene pentamine | 15 | 100 |
| 7 | N-stearyl tetrapropylene pentamine | 5 | 75 |
| 8 | N-stearyl tetrapropylene pentamine | 2 | 50 |

*Percentage w/w amine relative to Pigment Yellow 12 product.

We claim:

1. Colour Index Pigment Yellow 12 in a crystalline form which exhibits an X-ray diffraction pattern having three prominent X-ray diffraction lines corresponding to "d" spacings of 11.82, 7.71 and $3.32 \times 10^{-10}$ meters.

2. A mixture comprising at least 10% of Pigment Yellow 12 according to claim 1 together with a known polymorph of Pigment Yellow 12.

3. A mixture comprising at least 25% of Pigment Yellow 12 according to claim 1 together with a known polymorph of Pigment Yellow 12.

4. A mixture comprising at least 50% of Pigment Yellow 12 according to claim 1 together with a known polymorph of Pigment Yellow 12.

5. A process for preparing Pigment Yellow 12 as claimed in claim 1 which comprises coupling tetrazotised 3,3'-dichlorobenzidine with acetoacetanilide in the presence of a surfactant which is a polyamine, polyether, tertiary amine or quaternary ammonium compound.

6. A process as claimed in claim 5 in which the surfactant is a compound of formula I

$$R-[NH-(CH_2)_n]_m NH_2 \qquad (I)$$

in which R is an alkyl or aralkyl group, m is greater than 0 and n is 2 or 3.

7. A process as claimed in claim 5 in which the surfactant is a compound of formula II

$$R-[O-(CH_2)_n]_m OH \qquad (II)$$

in which R is an alkyl or aralkyl group, m is greater than 0 and n is 2 or 3.

8. A process as claimed in claim 5 in which the surfactant is a compound of formula III or IV $$R\ R^1\ R^{11}\ N \qquad (III)$$

$$R\ R^1\ R^{11}\ R^{111}\ R^+\ X^- \qquad (IV)$$

in which R, $R^1$, $R^{11}$ and $R^{111}$ are the same or different and each is an alkyl, aralkyl or aryl group, and $X^-$ is a cation.

9. A process as claimed in claim 5 in which the surfactant is used in an amount of at least 15% by weight based on the amount of pigment Yellow 12 formed in the reaction.

* * * * *